United States Patent [19]

McCabria

[11] 4,409,502

[45] Oct. 11, 1983

[54] SELF-COOLED ELECTRICAL MACHINE WITH INTEGRATED FAN AND SALIENT POLE ROTOR

[75] Inventor: Jack L. McCabria, Lima, Ohio

[73] Assignee: Westinghouse Electric Corp., Pittsburgh, Pa.

[21] Appl. No.: 331,725

[22] Filed: Dec. 17, 1981

[51] Int. Cl.³ .............................................. H02K 1/32
[52] U.S. Cl. ...................................... 310/61; 310/62; 310/68 D; 310/165; 310/214; 310/269
[58] Field of Search ............... 310/65, 54, 269, 270, 310/60 R, 61, 58, 57, 59, 64, 68 D, 60 A, 65, 62, 63, 52, 53, 214, 215

[56] References Cited

U.S. PATENT DOCUMENTS

| | | | |
|---|---|---|---|
| 2,724,064 | 11/1955 | Kilner | 310/61 |
| 2,897,383 | 7/1959 | Barrows | 310/68 D |
| 2,899,573 | 8/1956 | Wesolowski | 310/60 |
| 2,974,239 | 3/1961 | Havelka et al. | 310/269 |
| 3,471,727 | 10/1969 | Sedlock et al. | 310/59 |
| 3,588,557 | 6/1971 | Kilgore et al. | 310/60 |
| 3,596,120 | 7/1971 | Potter | 310/61 |
| 3,629,629 | 12/1971 | Liebe et al. | 310/59 |
| 3,660,702 | 5/1972 | Kishino | 310/61 |
| 3,684,906 | 8/1972 | Lenz | 310/61 |
| 3,716,732 | 2/1973 | Tillma | 310/61 |
| 3,740,596 | 6/1973 | Curtis et al. | 310/54 |
| 3,742,266 | 6/1973 | Heller et al. | 310/54 |
| 3,781,581 | 12/1973 | Lehuen et al. | 310/215 |
| 3,831,050 | 8/1974 | Laskaris | 310/270 |
| 3,921,018 | 11/1975 | Frankenhauser | 310/59 |
| 4,152,610 | 5/1979 | Wallenstein | 310/59 |
| 4,233,533 | 11/1980 | Lown | 310/59 |

*Primary Examiner*—R. Skudy
*Attorney, Agent, or Firm*—R. P. Lenart

[57] ABSTRACT

A self-cooled rotating electrical machine is provided with multiple axial and radial coolant passages. Wedges within the interpolar spaces of a salient pole rotor provide an axial coolant path which receives coolant deflected by vanes on the end of the wedges. Coolant expelled at the center of the wedges passes through axial passages in the stator and through a gap between the rotor and stator. Impeller tabs on the ends of the wedges force coolant around stator windings. Recirculation of coolant is prevented by shrouds attached to the ends of the wedges.

8 Claims, 9 Drawing Figures

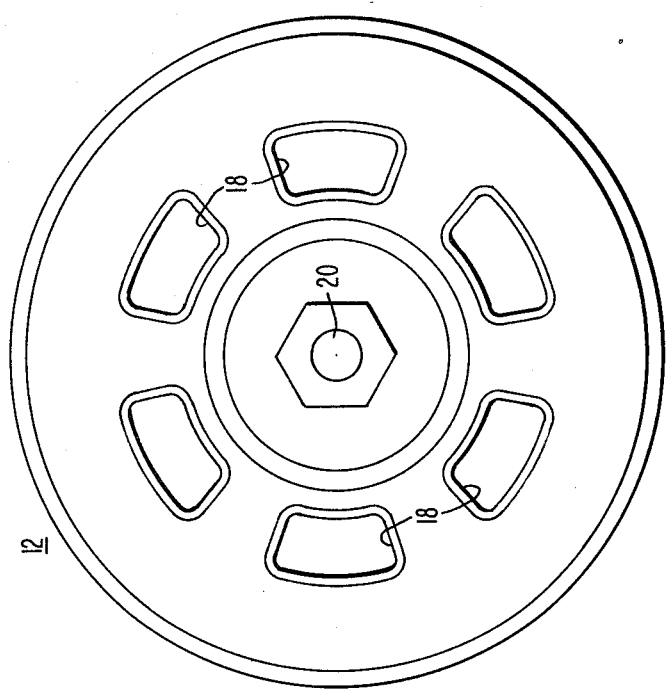
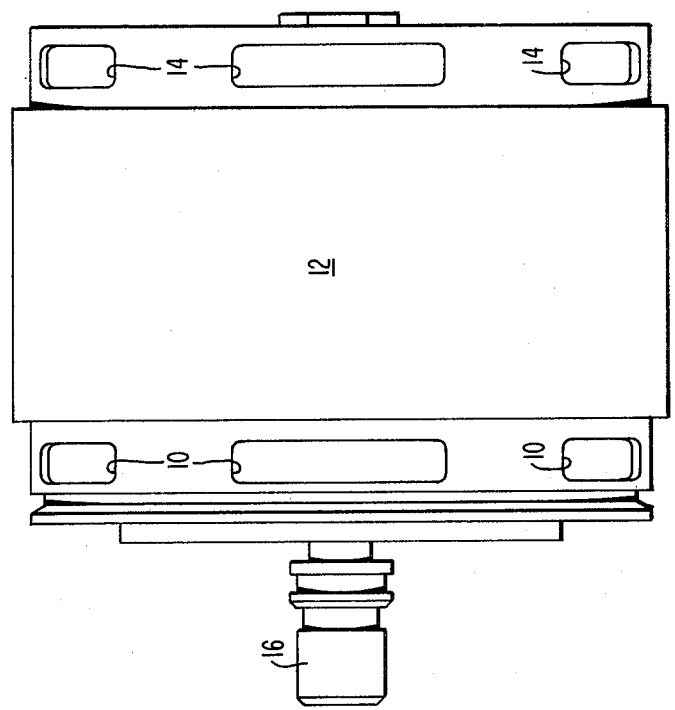

SELF-COOLED ELECTRICAL MACHINE WITH INTEGRATED FAN AND SALIENT POLE ROTOR

BACKGROUND AND SUMMARY OF THE INVENTION

This invention relates to electric machines and more particularly to improvements in the circulation of cooling gas through the structure of such machines.

Improvements in the efficiency of cooling rotating electrical machinery result in increased capacity or power output for a given machine. In machines which are cooled by the circulation of air or other gases, the coolant is generally forced through various passages in the machine by a fan. Attempts to improve cooling efficiency by maximizing the exposure of machine components to coolant and minimizing obstructions to the flow of coolant have resulted in machine designs which include coolant passages throughout the rotor and stator. Examples of such machines can be found in U.S. Pat. No. 2,724,064, issued Nov. 15, 1955; U.S. Pat. No. 3,660,702, issued May 2, 1972; and U.S. Pat. No. 3,684,906, issued Aug. 15, 1972.

In certain applications for electric machines such as alternators for vehicular auxiliary power systems, space and efficiency requirements sometimes do not allow the use of conventional fans for the circulation of coolant through the alternator. For these applications, electrical machines have been designed which circulate coolant through axial passages in the rotor and use the principle of centrifugal force to pump the coolant radially throughout the machine. U.S. Pat. No. 3,471,727, issued Oct. 7, 1969, discloses a machine which incorporates this type of cooling arrangement.

Machines which utilize salient pole rotors have been provided with wedges in the interpole spaces to conduct coolant through these spaces. U.S. Pat. No. 2,899,573, issued Aug. 11, 1959 discloses a salient pole rotor cooling wedge. The present invention utilizes cooling wedges with integral vanes and impeller elements in combination with multiple cooling passages and shrouds which prevent recirculation of coolant to provide for the efficient circulation of coolant throughout an electrical machine with a salient pole rotor.

An electrical machine, such as an alternator, constructed in accordance with the present invention includes a frame assembly with multiple inlet and outlet ports for the passage of a coolant such as air. A rotor within the frame assembly is provided with A-shaped wedges within each interpole space. These wedges include a vane and impeller on each end to force cooling air through the machine. Air entering through certain ports in the frame assembly passes through an exciter generator which is located at the drive end of the frame assembly. Air entering through other ports in the frame assembly passes through a rotating rectifier assembly located within the rotor.

After passing through the exciter generator and/or the rotating rectifier assembly, this air enters the main cooling circuit of the machne which comprises frame intake and exhaust ports, A-shaped wedges located within interpole spaces in the rotor, radial vanes and impellers on the ends of these wedges, shrouds on the ends of the wedges to prevent recirculation of cooling air, a gap between the stator assembly and rotor, and axial cooling passages in the stator assembly and frame.

Each of the A-shaped wedges include an axial rotor cooling passage which runs the length of the rotor. As the rotor turns, vanes on the ends of the wedges impart an outward flow due to centrifugal force action upon the air. Part of the air enters the slots in the wedges at the anti-drive end of the rotor. A portion of that air is expelled at the center of the rotor through holes in the center of the wedges while the remainder is expelled at the drive end of the rotor.

Air entering near both ends of the rotor is forced by the impellers, past the stator end turns and out one of the exhaust ports. Prior to being exhausted, air from the drive end of the stator passes through cooling passages in the frame.

Additional cooling paths are provided by a gap between the rotor and stator and by axial stator cooling passages in the stator assembly. These passages receive the air which had been expelled from the A-shaped wedges at the center of the rotor. This air is expelled through apertures in the wedges. Some of these apertures are radially aligned with openings in the axial stator cooling passages. This provides for the efficient transfer of coolant from the rotor to the stator assembly.

Shrouds on the end of the A-shaped wedges form close seals with the frame and the exciter generator to prevent recirculation of coolant after it has passed the impeller tabs. This ensures generally radial flow of coolant near each end of the rotor.

BRIEF DESCRIPTION OF THE DRAWINGS

FIG. 1 is a plan view of an alternator constructed in accordance with one embodiment of the present invention;

FIG. 2 is an end view of the alternator of FIG. 1;

DESCRIPTION OF THE PREFERRED EMBODIMENT

Figure 3:
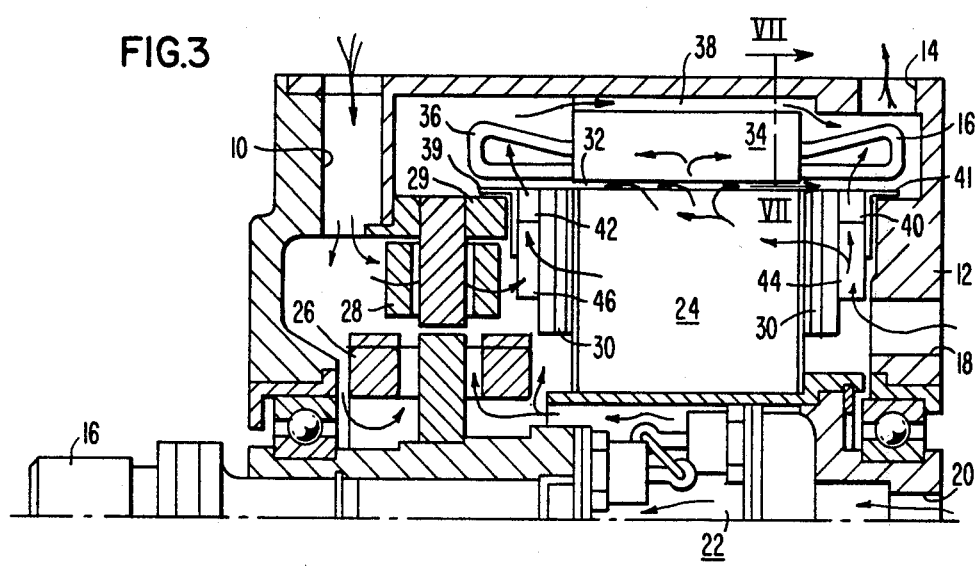
FIG. 3 is a sectional view of the alternator of FIG. 1.

Referring to the drawings in detail, FIG. 1 shows a plan view of an alternator constructed in accordance with the present invention. Coolant inlet ports 10 are shown at the drive end of frame 12 while coolant outlet ports 14 are shown at the anti-drive end of frame 12. The alternator is driven by way of shaft 16.

FIG. 2 is an end view of the anti-drive end of the alternator of FIG. 1 and shows additional coolant inlet ports 18 and 20.

FIG. 3 is a cross sectional view of the alternator of FIG. 1, in which the flow of coolant, such as air, is indicated by arrows. Rotating rectifier assembly 22 is located along the central axis of rotor 24 and is cooled by coolant which enters frame 12 through port 20. After passing through openings in rectifier assembly 22, this coolant flows around the armature coils 26 of an exciter generator located in the drive end of frame 12. Then the coolant enters the main alternator cooling circuit.

Coolant which enters through inlet ports 10 primarily flows between exciter field coils 28 prior to entering the main alternator cooling circuit. However, a portion of this coolant flows around the armature coils 26 of the exciter generator. The main alternator cooling circuit includes coolant passages through wedges 30 located in each interpolar space of salient pole rotor 24, through annular gap 32 between rotor 24 and stator assembly 34, through axial stator cooling passages in stator assembly 34, around the end turns of stator windings 36, and through frame coolant passage 38.

Shrouds 39 and 41 are attached to the ends of wedges 30 to prevent recirculation of coolant thereby maintaining radially outward flow. Shroud 39 attached to the drive end of wedge 30 forms a close clearance seal between the exciter stator 29 and impeller tabs 42. Shroud 41 attached to the anti-drive end of wedge 30 forms a close clearance seal between the frame 12 and impeller tabs 41.

Figure 4:
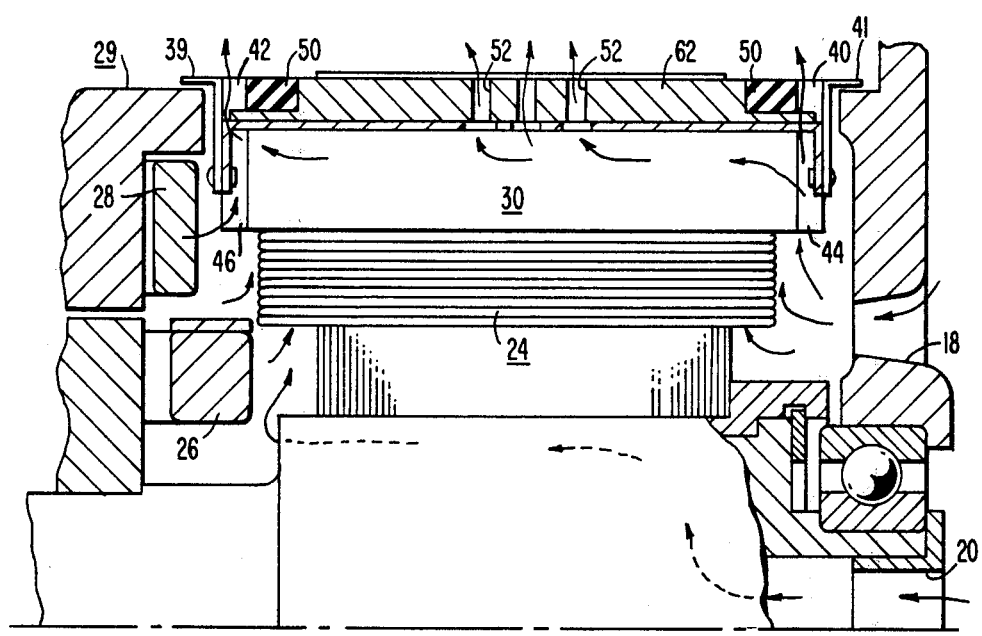
FIG. 4 is a partial sectional view of the rotor of the alternator of FIG. 1.

FIG. 4 illustrates that circulation of coolant in the main alternator cooling circuit is provided by impeller tabs 40 and 42, vanes 44 and 46, and A-shaped wedges 30. Each interpolar space on salient pole rotor 24 contains an A-shaped wedge 30 which includes two radial legs and a circumferential cross piece. An axial rotor cooling passage extends along the length of each wedge. Two vanes 44 and 46 are attached to opposite legs of each wedge at opposite ends of rotor 24. These vanes extend axially beyond the interpolar space of the rotor. As the rotor turns, vane 44 which is attached to the trailing leg of wedge 30 acts to divert coolant which has entered frame 12 through aperture 18 into the axial rotor cooling passage of wedge 30.

A portion of the coolant which enters through port 18 is propelled by tabs 40 of the impeller, flows past the anti-drive end turns of stator winding 36 and is exhausted through outlet port 14, as shown in FIG. 3. Impeller tabs 40 and 42 are attached to the ends of wedge 30 and are raised after band rings 50, which encircle rotor 24, have been assembled to prevent axial movement of the rings.

Centrifugal force causes a portion of the coolant in the axial rotor cooling passage of wedge 30 to pass through aperture 52 in the circumferential cross piece of wedge 30. FIG. 3 shows that a portion of this coolant travels axially within annular gap 32 between rotor 24 and stator assembly 34, while the remainder passes into stator assembly 34.

Coolant within the axial rotor cooling passage of wedge 30 which does not pass through apertures 52 continues to flow toward the drive end of the alternator. Vanes 46 which are attached to the leading leg of wedge 30 create a vacuum which draws this coolant to the drive end of wedge 30. There it combines with other coolant which had entered through ports 10 and 20 and is propelled by impeller tabs 42 into the remainder of the main alternator cooling circuit.

Figure 5:
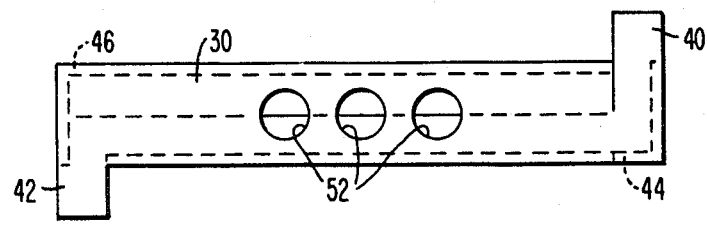
FIG. 5 is a top view of the wedge shown in FIG. 4.

FIG. 5 is a top view of the wedge 30 of FIG. 4. The positions of impeller tabs 40 and 42 and vanes 44 and 46 are shown to further illustrate the manner in which coolant is diverted into the axial rotor cooling passage of wedge 30.

Figure 6:
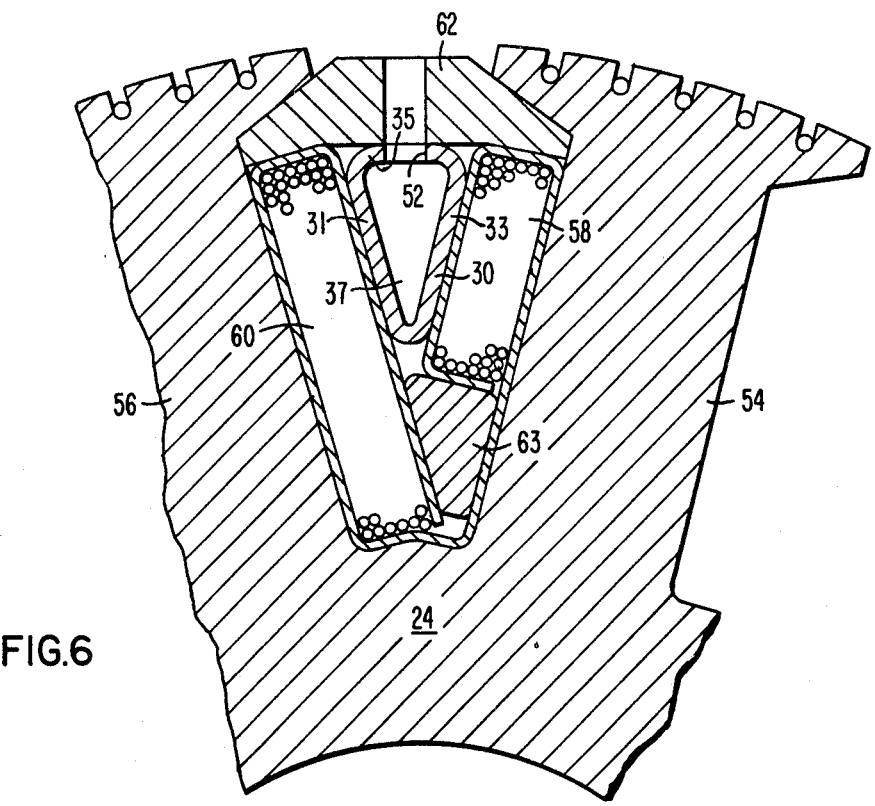
FIG. 6 is a cross-sectional view of the interpole space between two poles of the rotor of the alternator of FIG. 1.

FIG. 6 is a cross-sectional view of the interpolar space between two poles 54 and 56 of salient pole rotor 24. Wedge 30 includes radially disposed legs 31 and 33, and circumferentially disposed surface 35, which are arranged to form the sides of axial rotor cooling passage 37. Wedge 30 is shown to be in intimate thermal contact with rotor windings 58 and 60. Aperture 52 in surface 35 of wedge 30 extends through wedge retainer 62 to pass coolant out of wedge 30. A solid spacer 63 is located below winding 58 to facilitate assembly of the rotor.

Figure 7:
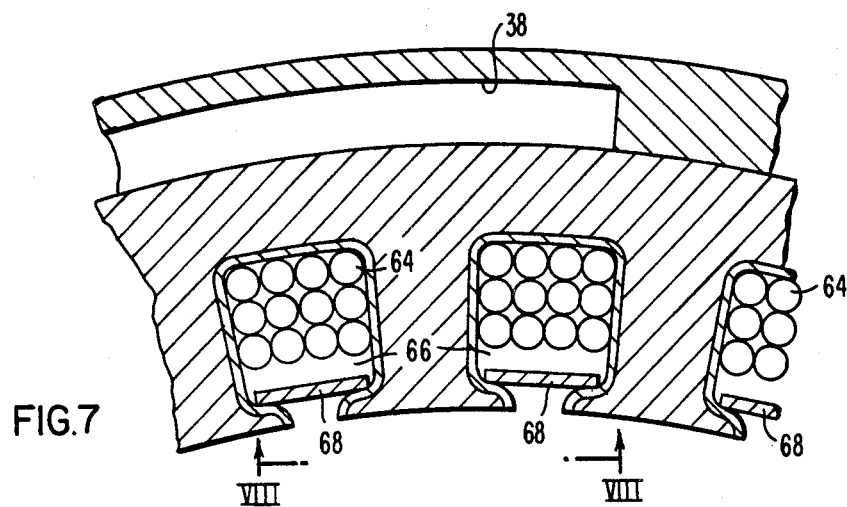
FIG. 7 is a partial cross-sectional view of the stator assembly and frame of the alternator of FIG. 3, taken along line VII—VII.

FIG. 7 is a partial sectional view of the stator assembly and frame of the alternator of FIG. 2. Stator windings 64 are located in frame 12 with sufficient space remaining in the stator slots to form axial stator cooling passages 66. A rectangular bar 68 has been inserted to form one side of each axial stator cooling passage 66. FIG. 7 also shows frame coolant passages 38 located near the periphery of frame 12. Coolant which has passed around the drive end turns of stator coil 36 passes through frame coolant passages 38 prior to being exhausted from the alternator through ports 14.

Figure 8:
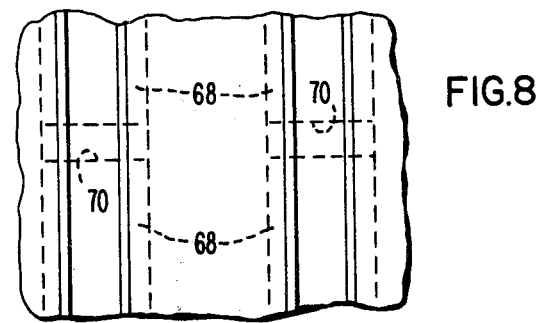
FIG. 8 is a plan view of a slot leading to the stator cooling passage of FIG. 7.

FIG. 8 shows that bar 68 contains a gap 70 which serves as an opening through which coolant can enter axial stator cooling passage 66. This gap is radially aligned with apertures 52 in wedge 30 as shown in FIG. 6. The radial alignment ensures that cooling being expelled through apertures 52 of wedges 30 will pass into axial stator cooling passages 66.

Figure 9:
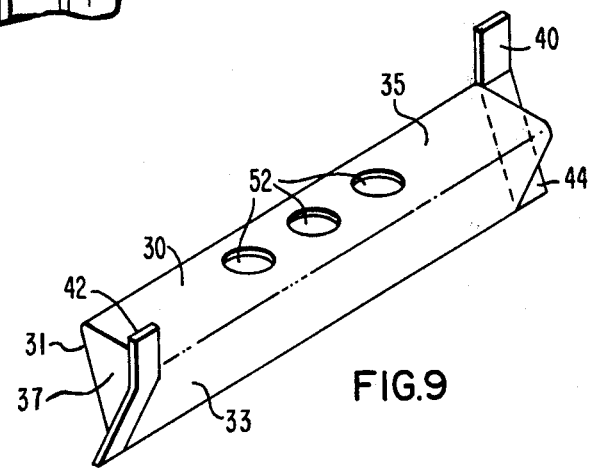
FIG. 9 is a perspective view of the wedge of FIG. 5.

FIG. 9 is a perspective view of the wedge of FIG. 5. Impeller tabs 40 and 42 are shown near the ends of wedge 30. Apertures 52 are located in the center of the circumferential cross piece of wedge 30. Apertures 52 are located in the center of the circumferential cross piece of wedge 30. Vane 44 is seen on the trailing leg of wedge 30 as its rotates in the alternator.

I claim:

1. A self-cooled electrical machine comprising:
   a frame having a plurality of inlet and outlet ports;
   a stator assembly within said frame, said stator assembly having a plurality of axial stator cooling passages;
   a rotor within said frame, said rotor including a plurality of poles with interpole spaces between said poles;
   a plurality of wedges each disposed within one of said interpole spaces, and each having two radially disposed legs and one circumferentially disposed surface;
   said radially disposed legs and said circumferentially disposed surface of each of said wedges forming an axial rotor cooling passage extending along the length of said wedge and having a plurality of apertures in said circumferentially disposed surface;
   said axial stator cooling passages having an opening which is in radial alignment with at least one of said apertures in each of said wedges;
   a plurality of radial vanes, one of said vanes being attached to one end of each of said wedge legs wherein one of said vanes extends from each end of said wedges to a point beyond said interpole space;
   an impeller tab attached to each end of each of said wedges said tabs propelling coolant radially as said rotor turns; and
   a shroud attached to each end of each of said wedges, said shrouds preventing recirculation of coolant after said coolant has been propelled by said impeller tabs.

2. A self-cooled electrical machine as recited in claim 1, further comprising axial frame cooling passages within said frame, said axial frame cooling passages providing a path for coolant flow from one end of said stator assembly to said outlet ports.

3. A self-cooled electrical machine as recited in claim 1, further comprising:
- a rotating rectifier assembly disposed within said rotor; and
- a cooling path including one of said frame inlet ports, said rectifier assembly and said impeller tabs.

4. A self-cooled electrical machine as recited in claim 1, further comprising an exciter generator disposed within said frame; and
- a cooling path including one of said inlet ports, said exciter generator, and one of said impeller tabs.

5. A self-cooled electrical machine as recited in claim 1, wherein each of said openings in said axial stator cooling passages includes a gap in a rectangular bar, said bar forming one side of each of said axial stator cooling passages.

6. A self-cooled electrical machine as recited in claim 1, further comprising an annular gap between said rotor and said stator assembly.

7. A self-cooled electrical machine as recited in claim 1, further comprising a band ring encircling said rotor at each end thereof.

8. A self-cooled electrical machine as recited in claim 1, further comprising a wedge retainer in each of said interpolar spaces, said wedge retainers having radial openings in radial alignment with said wedge apertures.

* * * * *